(12) United States Patent
Ishida

(10) Patent No.: US 8,582,921 B2
(45) Date of Patent: Nov. 12, 2013

(54) FIGURE PROCESSING APPARATUS, FIGURE PROCESSING METHOD, AND STORAGE MEDIUM

(75) Inventor: Yoshihiro Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 13/278,544

(22) Filed: Oct. 21, 2011

(65) Prior Publication Data

US 2012/0106843 A1  May 3, 2012

(30) Foreign Application Priority Data

Nov. 2, 2010  (JP) ................................ 2010-246429

(51) Int. Cl.
  *G06K 9/32*  (2006.01)
(52) U.S. Cl.
  USPC .......................................................... 382/294
(58) Field of Classification Search
  USPC .................................................. 382/292–295
  See application file for complete search history.

(56) References Cited

U.S. PATENT DOCUMENTS

| | | | | |
|---|---|---|---|---|
| 2007/0230809 A1* | 10/2007 | Ishida | ............................ | 382/242 |
| 2007/0230810 A1* | 10/2007 | Kanatsu | ........................ | 382/243 |
| 2009/0096793 A1* | 4/2009 | Hirasawa et al. | ............. | 345/441 |
| 2009/0115867 A1* | 5/2009 | Ishida | ........................ | 348/222.1 |
| 2009/0274363 A1* | 11/2009 | Dai | ................................ | 382/164 |
| 2009/0284801 A1* | 11/2009 | Sakaue et al. | ................ | 358/3.27 |
| 2010/0275018 A1* | 10/2010 | Pedersen | ....................... | 713/168 |
| 2011/0167081 A1* | 7/2011 | Kosaka et al. | ................ | 707/769 |

FOREIGN PATENT DOCUMENTS

| | | |
|---|---|---|
| JP | 6-337929 A | 12/1994 |
| JP | 3-183690 B2 | 7/2001 |
| JP | 4-185858 B2 | 11/2008 |

\* cited by examiner

*Primary Examiner* — Jingge Wu
(74) *Attorney, Agent, or Firm* — Canon U.S.A., Inc. IP Division

(57) ABSTRACT

When an image including a composite figure made of a predefined figure and a free-form figure is scanned, the position and shape of the free-form figure and the predefined figure are appropriately adjusted. The composite figure is separated into a predefined figure and a free-form figure. With respect to the separated predefined figure, a representative point is set at a predetermined position according to the type of the predefined figure and a representative point is set for the free-form figure based on a criterion according to a type of the free-form figure. If the representative point of a predefined figure is in the vicinity of the representative point of the free-form figure, the free-form figure is corrected based on the position of the representative point of the free-form figure and the position of the representative point of the predefined figure.

19 Claims, 15 Drawing Sheets

FIG.3A
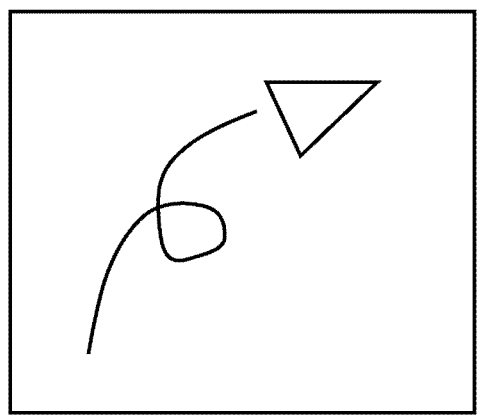
FIG.3B   FIG.3C
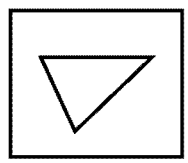   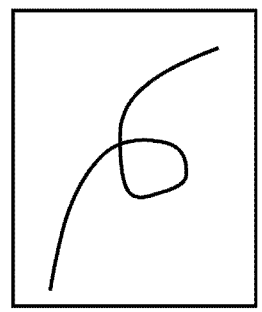

FEATURE INFORMATION FOR CORRECTION
 : CIRCUMSCRIBED RECTANGLE
 : REPRESENTATIVE POINT
 : REFERENCE POINT
 : DIRECTIONAL AXIS
FIG.5A
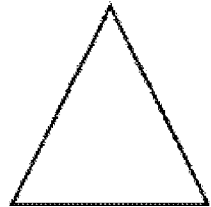
FIG.5B
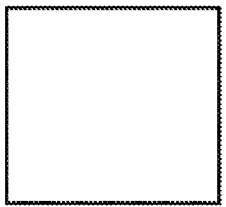
FIG.5C
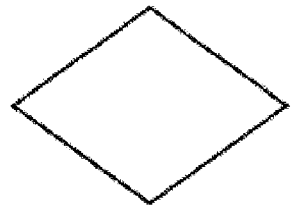
FIG.5D
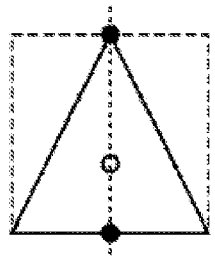
FIG.5E
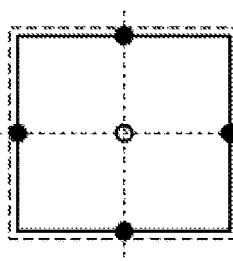
FIG.5F
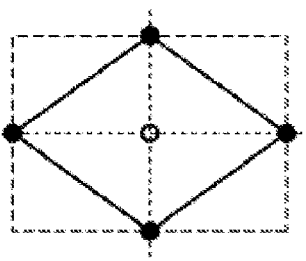
FIG.5G
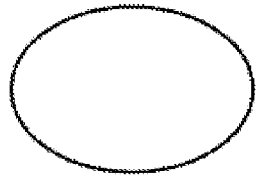
FIG.5H
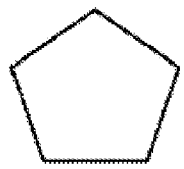
FIG.5I
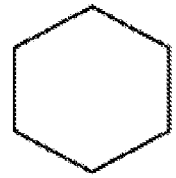
FIG.5J
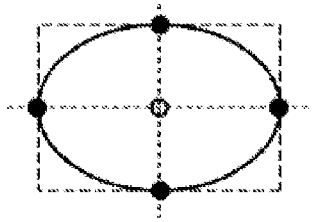
FIG.5K
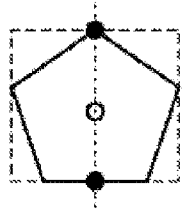
FIG.5L
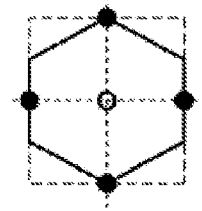

○ : REFERENCE POINT

● : REPRESENTATIVE POINT

▯ : CIRCUMSCRIBED RECTANGLE

⁞ : DIRECTIONAL AXIS

○ : REFERENCE POINT

● : REPRESENTATIVE POINT

▯ : CIRCUMSCRIBED RECTANGLE

⋮ : LINE CONNECTING REPRESENTATIVE POINT ON OPPOSITE SIDES

FIG.8

| FIGURE TYPE | SETTING OF REPRESENTATIVE POINT | CORRECTION METHOD |
|---|---|---|
| LINEAR OPEN-ENDED FIGURE (A LINEAR FIGURE WHOSE ENDS ARE OPEN AND ON A CIRCUMSCRIBED RECTANGLE) | TWO OPEN ENDS ARE SET AS REPRESENTATIVE POINTS. (DIRECTION OF LINE CONNTECTING REPRESENTATIVE POINTS IS SET AS DIRECTIONAL AXIS. MIDDLE POINT OF REPRESENTATIVE POINTS IS SET AS REFERENCE POINT.) | (i) IF NUMBER OF GROUPED PREDEFINED FIGURES IS ONE, MOVE FREE-FORM FIGURE SO THAT POSITION OF REPRESENTATIVE POINT OF FREE-FORM FIGURE OVERLAPS WITH POSITION OF REPRESENTATIVE POINT OF GROUPED PREDEFINED FIGURE<br><br>(ii) IF NUMBER OF GROUPED PREDEFINED FIGURES IS TWO, CORRECT FREE-FORM FIGURE SO THAT POSITIONS OF TWO REPRESENTATIVE POINTS OF FREE-FORM FIGURE OVERLAP WITH POSITIONS OF REPRESENTATIVE POINTS OF GROUPED PREDEFINED FIGURES<br>EXAMPLE 1 (MOVE + ROTATE + SCALE (FIXED LENGTH-TO-WIDTH RATIO))<br>EXAMPLE 2 (MOVE + SCALE (INDEPENDENT SCALING OF LENGTH AND WIDTH)) |
| OTHER FREE-FORM FIGURES | FOUR POINTS ON CIRCUMSCRIBED RECTANGLE ARE SET AS REPRESENTATIVE POINTS | (i) IF NUMBER OF GROUPED PREDEFINED FIGURES IS ONE, MOVE FREE-FORM FIGURE SO THAT POSITION OF REPRESENTATIVE POINT OF FREE-FORM FIGURE OVERLAPS WITH POSITION OF REPRESENTATIVE POINT OF GROUPED PREDEFINED FIGURE<br><br>(ii) IF NUMBER OF GROUPED PREDEFINED FIGURES IS TWO, CORRECT FREE-FORM FIGURE SO THAT POSITIONS OF TWO REPRESENTATIVE POINTS OF FREE-FORM FIGURE OVERLAP WITH POSITIONS OF REPRESENTATIVE POINTS OF GROUPED PREDEFINED FIGURES<br>EXAMPLE 1 (MOVE + ROTATE + SCALE (FIXED LENGTH-TO-WIDTH RATIO))<br>EXAMPLE 2 (MOVE + SCALE (INDEPENDENT SCALING OF LENGTH AND WIDTH))<br><br>(iii) IF NUMBER OF GROUPED PREDEFINED FIGURES IS THREE OR FOUR, CORRECT FREE-FORM FIGURE SO THAT REFERENCE POINT OF FREE-FORM FIGURE OVERLAPS WITH REFERENCE POINT OF POLYGON MADE UP OF LINE SEGMENTS FORMED BY CONNECTING REPRESENTATIVE POINTS OF GROUPED PREDEFINED FIGURES |

FIG.14A
FIG.14B
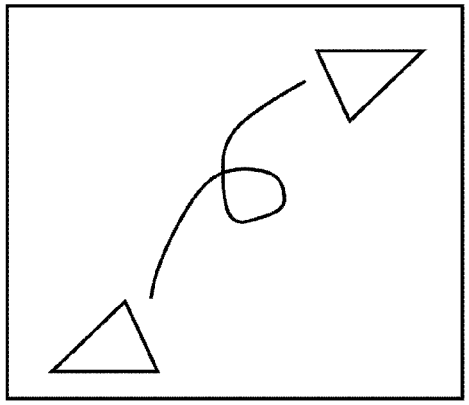
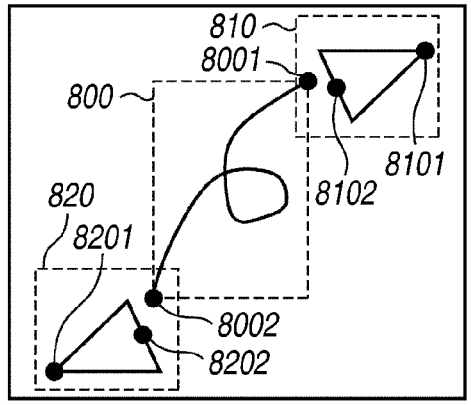
FIG.14C
FIG.14D
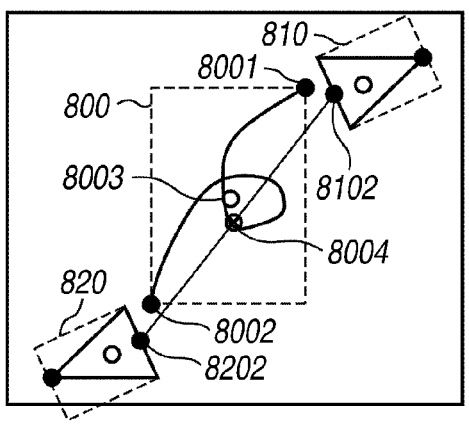
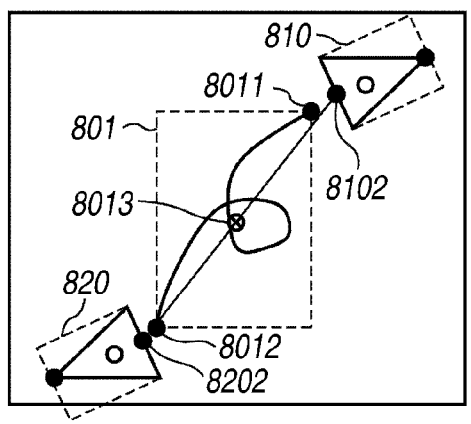
FIG.14E
FIG.14F
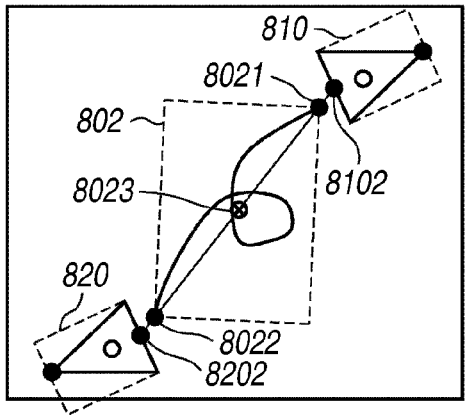
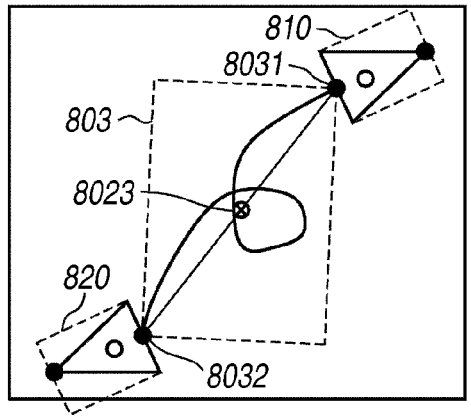

FIGURE PROCESSING APPARATUS, FIGURE PROCESSING METHOD, AND STORAGE MEDIUM

BACKGROUND OF THE INVENTION

1. Field of the Invention

The present invention relates to a figure processing apparatus which vectorizes a figure included in a raster image, a method, and a program.

2. Description of the Related Art

A method for recognizing a figure included in a raster image and generating electronic data of the image so that it can be processed by a computer is being proposed.

Japanese Patent Registration 3183690 discusses a method for generating a neatly-arranged flowchart from a hand-drawn flowchart image. In generating such a flowchart, raster image data of a hand-drawn image is vectorized. Then, the shape of the flowchart symbol, such as a circle, rectangle, or rhombus, included in the vector data is recognized, and the format of the data is converted into a format appropriate for the recognized flowchart symbol.

Further, Japanese Patent Application Laid-Open No. 06-337929 discusses a method for implementing correction processing when a raster figure is converted into a vector figure. The figure is classified according to its type, and the content and the order of the correction processing is changed according to the result of the classification. For example, if the figure is made of straight lines, processing such as connecting the neighboring lines, correcting the straight lines, and deleting an extremely small figure is performed after the vectorization. Further, if the figure is made of a curved line, processing such as neighboring line connection and extremely small figure deletion is performed after the vectorization.

Further, Japanese Patent Registration 4185858 discusses a method for dividing a raster image, which is obtained by scanning, into blocks according to its attribute. After then, vectorization of each block is performed. Regarding a region where a great amount of data is necessary due to vectorization, image data of such a region is stored instead of the vector data.

In the description below, a figure having a predetermined shape such as a circle, rectangle, rhombus, triangle, etc. is called a predefined figure and a figure (line drawing) freely drawn by a user is referred to as a free-form figure. For example, Microsoft Office® has a function called "AutoShape". According to AutoShape, a figure of a predetermined shape (i.e., predefined figure in the present invention) is prepared, and the user can create a drawing by using the predetermined shape.

On the other hand, in some cases, a figure other than a single predefined figure, a single figure made of straight lines, or a single free-form figure is included in a common business document. For example, in some cases, the user creates a composite figure by combining a free-form figure and a predefined figure. However, if the figure is not neatly formed, in spite of the user's intention, there may be a space between the free-form figure and the predefined figure. When a document including such figures is printed on paper, the figures are printed with a space in between.

Further, if this printed document is scanned, since there is a space between the figures, the figures are recognized as different objects. In other words, in spite of the user's intention, the objects are recognized as different objects. Thus, if the user desires to form one object from such objects, the user that performs the scanning needs to manually correct them, which is burdensome.

SUMMARY OF THE INVENTION

The present invention is directed to an apparatus including a separation unit configured to separate a figure included in an input image into a predefined figure of a predetermined shape and a free-form figure, a first setting unit configured to set a first representative point at a predetermined position according to a type of the predefined figure with respect to the separated predefined figure, a second setting unit configured to set a second representative point according to a criterion based on a type of the free-form figure with respect to the separated free-form figure, a grouping unit configured to, if the first representative point is in the vicinity of the second representative point, group the second representative point and the first representative point, and a figure correction unit configured to correct the free-form figure based on a position of the grouped second representative point and a position of the grouped first representative point.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A to 3C illustrate examples of an input figure including a predefined figure and a free-form figure.

FIGS. 5A to 5L are examples of feature information for correction of a predefined figure.

FIG. 8 is a table of a representative point setting method and a correction method according to figure types.

FIGS. 14A to 14F are correction examples of a case where two predefined figures are grouped with a free-form figure according to the first exemplary embodiment.

DESCRIPTION OF THE EMBODIMENTS

Various exemplary embodiments, features, and aspects of the invention will be described in detail below with reference to the drawings.

Figure 1:
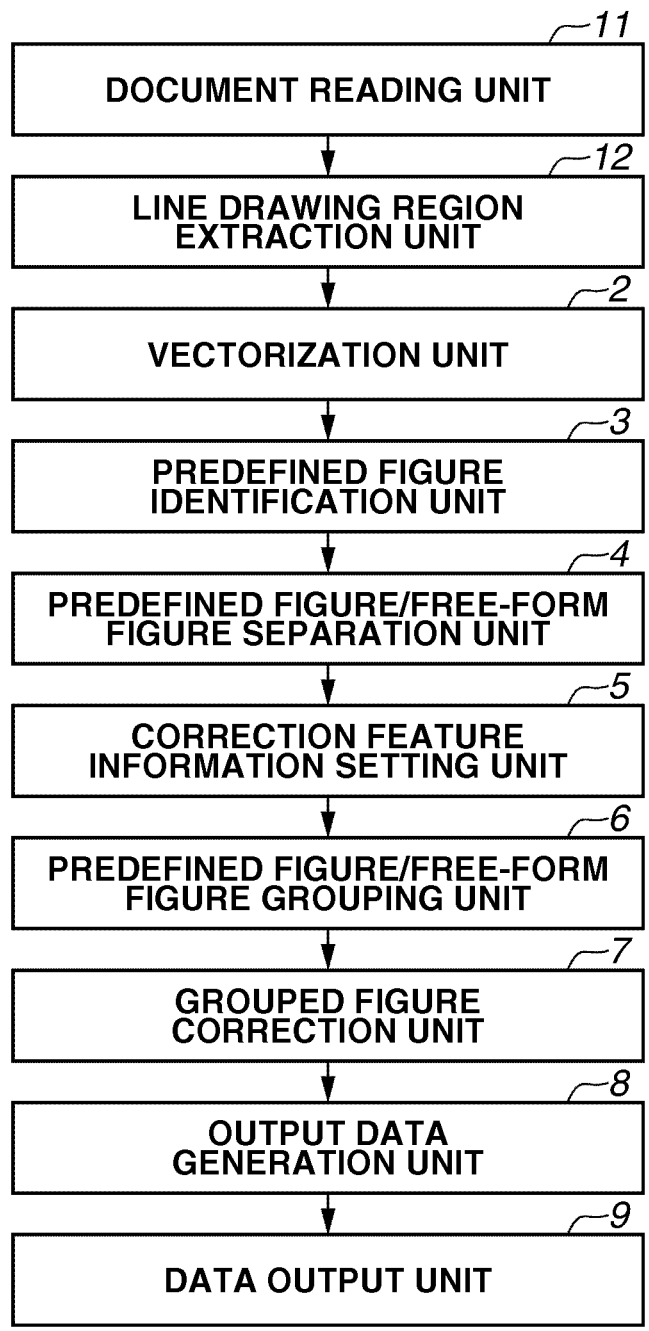
FIG. 1 is a block diagram illustrating a functional configuration of a figure processing apparatus according to a first exemplary embodiment of the present invention.

FIG. 1 is a function block diagram of a figure processing apparatus (image processing apparatus) according to a first exemplary embodiment of the present invention. In FIG. 1, a document reading unit 11 obtains a document image by reading a document with a scanner or a camera. The document includes a line drawing. A line drawing region extraction unit 12 extracts a region of the line drawing from the document image obtained by the document reading unit 11. A vectorization unit 2 vectorizes a line drawing figure included in the line drawing region extracted by the line drawing region extraction unit 12. Accordingly, vector data is obtained.

A predefined figure identification unit 3 identifies a predefined figure included in the line drawing region based on the vector data obtained by the vectorization unit 2. A predefined figure/free-form figure separation unit 4 separates the line drawing region into predefined figures and free-form figures. In other words, the predefined figure/free-form figure separation unit 4 removes the figure components which have been identified as predefined figures by the predefined figure identification unit 3 from the vector data which has been obtained from the line drawing region, and determines the remaining figure components as free-form figures. In this manner, the predefined figures and the free-form figures, which are included in the line region, can be separated.

A correction feature information setting unit 5 sets feature information for correction of each of the predefined figures and the free-form figures separated by the predefined figure/free-form figure separation unit 4. Then, based on a rule determined in advance, a predefined figure/free-form figure grouping unit 6 determines the figures to be grouped out of the predefined figures and the free-form figures separated by the predefined figure/free-form figure separation unit 4.

A grouped figure correction unit 7 corrects each of the figures grouped in a same group which have been grouped by the predefined figure/free-form figure grouping unit 6 using a method determined in advance. An output data generation unit 8 generates output data by converting the information of the figure data, which has been vectorized by the vectorization unit 2 and corrected by the grouped figure correction unit 7, in the line drawing, into data in a predetermined output format (e.g., scalable vector graphics (SVG) format). A data output unit 9 outputs the output data generated by the output data generation unit 8 in the predetermined output format.

Figure 2:
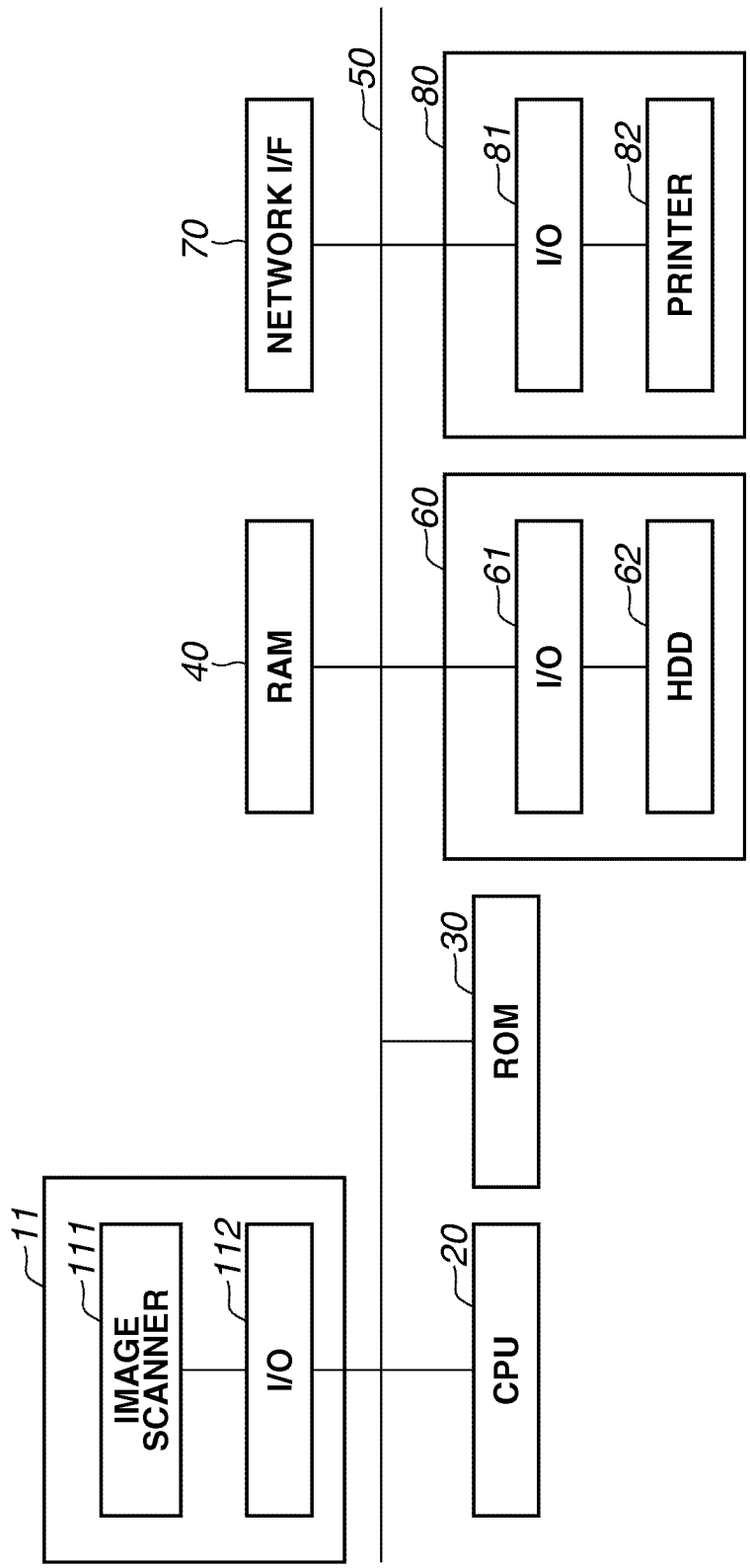
FIG. 2 is a block diagram illustrating an example of a hardware configuration of the figure processing apparatus.

FIG. 2 is a block diagram illustrating an example of a hardware configuration of the figure processing apparatus illustrated in FIG. 1. In FIG. 2, an image scanner 111 is connected to a bus 50 via an I/O interface 112. The document reading unit 11 in FIG. 1 includes the image scanner 111 and the I/O interface 112. By executing a computer program stored in a ROM 30, a CPU 20 functions as the line drawing region extraction unit 12, the vectorization unit 2, the predefined figure identification unit 3, the predefined figure/free-form figure separation unit 4, the correction feature information setting unit 5, the predefined figure/free-form figure grouping unit 6, the grouped figure correction unit 7, and the output data generation unit 8, all of which are illustrated in FIG. 1.

A RAM 40 is used as a working memory or an image storage memory. A hard disk 62 is connected to the bus 50 via an I/O interface 61. The hard disk 62 is included in an external storage unit 60. A printer 82 is connected to the bus 50 via an I/O interface 81. The printer 82 is included in a data print output apparatus 80. Further, a network I/F 70 is connected to the bus 50. Data output from the data output unit 9 in FIG. 1 is transmitted to the external storage unit 60, the data print output apparatus 80, or the network I/F 70.

The image to be processed of the present invention can be an image input via the document reading unit 11 (scanner 111) as described above, but can also be an image stored in the external storage unit 60 or an image acquired from an external apparatus via the network I/F 70. In other words, the image to be processed is not limited to an image acquired according to the reading of the document reading unit 11 (scanner 111) but also an image input via other units.

FIG. 3A illustrates an example of an input figure including both a predefined figure and a free-form figure. FIG. 3B illustrates the predefined figure (isosceles triangle) included in the input figure illustrated in FIG. 3A. FIG. 3C illustrates the free-form figure included in the input figure illustrated in FIG. 3A. Outline of the processing executed by each of the processing units in FIG. 1 will be described with reference to FIGS. 3A to 3C and FIGS. 4A to 4E.

The input figure in FIG. 3A is an image to be processed. The image is an image in a line drawing region extracted from a document image by the line drawing region extraction unit 12. The line drawing region extraction unit 12 divides the document image into regions, each of which corresponds to each attribute, by a publicly known region segmentation technique (e.g., region segmentation technique in Japanese Patent Registration 4185858), and extracts a region having the attribute of a line drawing (figure) from the divided regions.

Figure 4A:
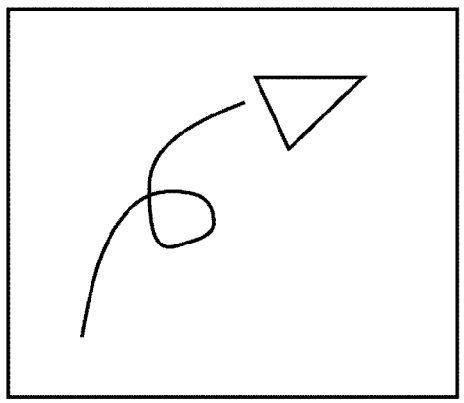
FIGS. 4A to 4E illustrate examples of grouping and figure correction of an input figure including a predefined figure and a free-form figure.

After then, the vectorization unit 2 vectorizes the input figure in FIG. 3A by a publicly known vectorization technique. As a result, vector data is acquired. FIG. 4A is a visual version of the vector data acquired by the vectorization of the input figure illustrated in FIG. 3A by the vectorization unit 2.

Figure 4B:
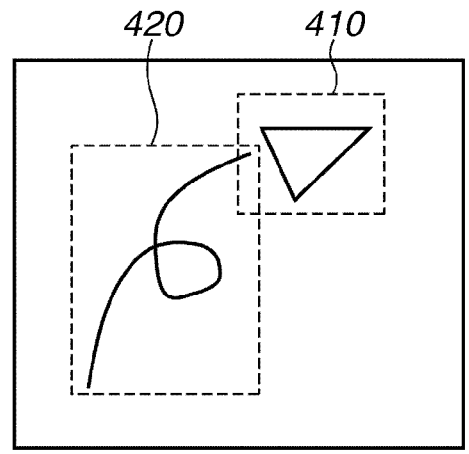

FIG. 4B illustrates a predefined figure component and a free-form figure component obtained from the vector data in FIG. 4A. In obtaining the vector data in FIG. 4B, first, the predefined figure identification unit 3 identifies a predefined figure component 410 (an isosceles triangle in this case) according to figure recognition of the vector data illustrated in FIG. 4A. For example, the predefined figure identification unit 3 performs matching of feature data (changing point of vector data, etc.) extracted from the vector data illustrated in FIG. 4A and feature data of each of the plurality of predefined figures defined in advance, and determines the predefined figure that matches most. This figure is the predefined FIG. 410. After then, the predefined figure/free-form figure separation unit 4 identifies a free-form figure component 420. This component is the vector data that remains when the figure/free-form figure separation unit 4 excludes the predefined figure component 410 identified by the predefined figure identification unit 3 from the vector data illustrated in FIG. 4A. In this manner, the vector data illustrated in FIG. 4A is separated into the predefined figure component 410 and the free-form figure component 420 as illustrated in FIG. 4B.

Figure 4C:
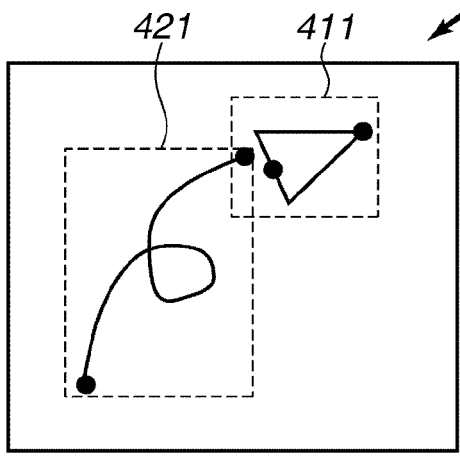

The correction feature information setting unit 5 sets feature information for correction to the vector data separated into the predefined figure component 410 and the free-form figure component 420 illustrated in FIG. 4B. The result is illustrated in FIG. 4C. The feature information for correction is set to a predefined figure 411 and a free-form figure 421. Detailed description of the feature information for correction will be given below. In FIG. 4C, black circles represent representative points of the predefined figure 411 and the free-form figure 421. The representative point is one type of feature information for correction and is a potential connection point which is used when the space between the neighboring figures is removed and the correction is performed.

Figure 4D:
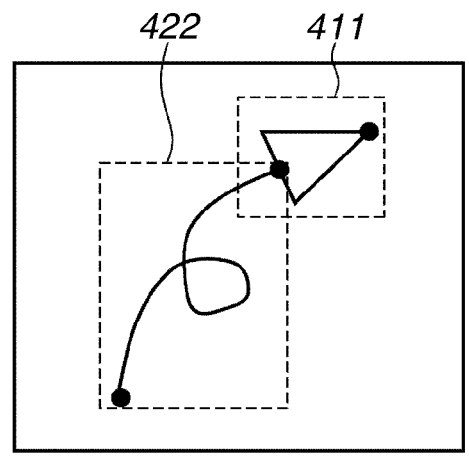

The predefined figure/free-form figure grouping unit 6 performs grouping of the predefined figure 411 and the free-form figure 421 including the feature information for correction illustrated in FIG. 4C. Further, the grouped figure correction unit 7 corrects the predefined figure and the free-form figure which have been grouped. FIG. 4D illustrates an example of a correction result. The grouped figure correction unit 7 performs parallel displacement or scaling of the free-form figure 421 so that a representative point of the free-form figure 421 and a representative point of the predefined figure 411 within a predetermined distance overlap one another. When the free-form figure 421 is corrected, a free-form figure 422 is obtained. Then, the output data generation unit 8 converts the format of the data of the figure group illustrated in FIG. 4D into a predetermined output format (e.g., SVG).

Figure 4E:
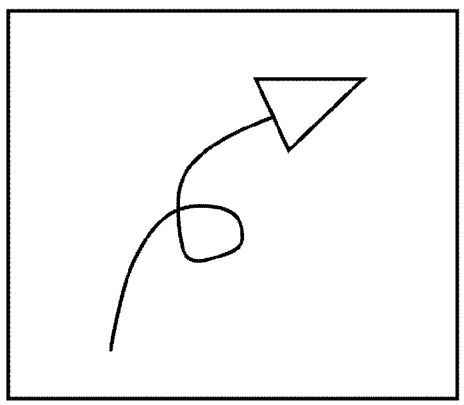

If the data in this format is rendered, a figure illustrated in FIG. 4E will be obtained. The generated data in the predetermined output format is output to, for example, the external storage unit 60 or the network I/F 70 via the data output unit 9.

The predefined figure identification unit 3 can be realized, for example, by a method discussed as figure recognition in the above-described Japanese Patent Registration 3183690. According to this method, data of a figure, which is determined as a figure image, is vectorized. Further, vector data that constitutes a closed shape is selected from the vectorized data. Then, it is determined whether a predefined figure that matches the vector data is included in the predefined figures which are defined according to a plurality of parameters. The parameters are determined in advance based on, for example, the changing points in the direction of rotation. The method used by the predefined figure identification unit 3, however, is not limited to such a method and other publicly-known method can be used as well.

For example, pattern recognition of a bitmap image can be performed in place of the figure recognition using the vector data. When the pattern recognition of a bitmap image is performed, a bitmap pattern recognized as a predefined figure according to the pattern recognition and other portions are separated. Then, the bitmap pattern recognized as a predefined figure is converted into vector data (predefined figure data) by identifying a parameter of the predefined figure determined in advance so that it matches the bitmap pattern. Regarding the bitmap pattern of other portions, outline of the figure included in the bitmap pattern is extracted and vectorized. In this manner, vector data of a free-form figure (free-form figure data) is generated.

FIGS. 5A to 5L illustrate examples of the predefined figures and feature information for correction of the predefined figures. FIGS. 5A, 5B, 5C, 5G, 5H, and 5I are examples of the predefined figures. FIG. 5A is an isosceles triangle. FIG. 5B is a rectangle (including a square). FIG. 5C is a rhombus. FIG. 5G is an ellipse. FIG. 5H is a regular pentagon. FIG. 5I is a regular hexagon. FIGS. 5D, 5E, 5F, 5J, 5K, and 5L illustrate feature information for correction corresponding to the predefined FIGS. 5A, 5B, 5C, 5G, 5H, and 5I. The relative position and the number of the positions set for the feature information for correction are determined in advance according to the shape of the predefined figure.

There are three types of feature information for correction: the representative point, the reference point, and the directional axis. The representative point is a potential connection point which is used when a space between neighboring figures is eliminated. The representative points are connected and the figure is corrected. The reference point is a point which is used when parallel movement or rotational movement of the whole figure is performed. In other words, the reference point is the center position of the figure. The directional axis is a reference direction which is used when the angle of rotation is determined. The angle of rotation is the angle the figure is rotated about the reference point. In FIGS. 5D, 5E, 5F, 5J, 5K, and 5L, the representative point is indicated by a small black circle. The reference point is indicated by a small white circle. The directional axis is indicated by a dotted line. Further, a circumscribed rectangle of each figure is indicated by broken lines for auxiliary means.

Figure 6A:
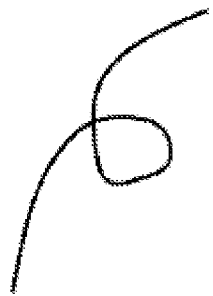
FIGS. 6A to 6D are examples of a linear open-ended figure and feature information for correction of the figure.
Figure 6B:
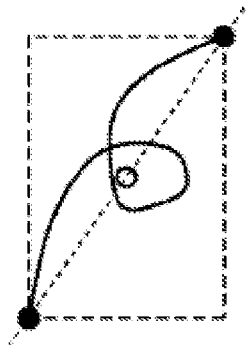
Figure 6C:

FIGS. 6A to 6D and 7A to 7D illustrate examples of free-form figures which are the figures other than the predefined figures and feature information for correction of such free-form figures. FIGS. 6A and 6C are examples of a free-form figure including a line having two unconnected endpoints (open ended). Further, the two open ends are on the circumscribed rectangle of the figure. According to the present embodiment, such a free-form figure is referred to as a linear open-ended figure.

Figure 7A:
FIGS. 7A to 7D are examples of a figure other than the linear open-ended figure and feature information for correction of the figure.
Figure 7B:
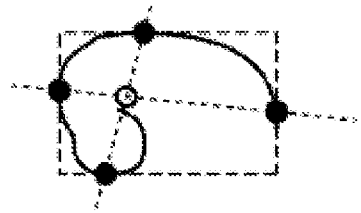
Figure 7C:
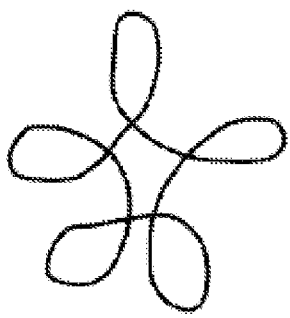

FIG. 7A is an open-ended free-form figure having two open ends which are not on the circumscribed rectangle. According to the present embodiment, such a figure is referred to as a general open-ended figure. FIG. 7C illustrates an example of a closed figure without an endpoint (close-ended). The whole figure forms one closed loop.

Figure 6D:
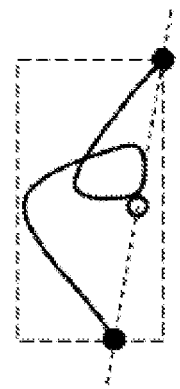
Figure 7D:
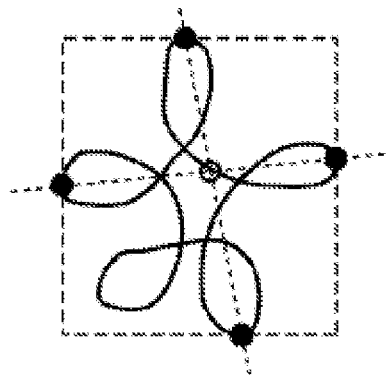

According to the present embodiment, a general open-ended figure as the one illustrated in FIG. 7A, a free-form figure including one open end, and a free-form figure including three or more open ends are classified as a closed figure such as the one illustrated in FIG. 7D for convenience. In FIGS. 6A to 6D and 7A to 7D, as the feature information for correction, the representative point is indicated by a small black circle, the reference point is indicated by a small white circle, and the directional axis is indicated by a dotted line. Further, a circumscribed rectangle of each figure is indicated by broken lines for auxiliary means.

Since the free-form figures in FIGS. 6A and 6C have two open ends and the two open ends are on the circumscribed rectangles, they are determined as linear open-ended figures. As illustrated in FIGS. 6B and 6D, the two open ends are set as the representative points. The direction of the straight line that connects the two representative points is referred to as the directional axis. Further, the midpoint of the two representative points is referred to as the reference point. The representative point, the directional axis, and the reference point which are set in this manner are used as the feature information for correction.

The free-form figures in FIGS. 7A and 7C are determined as figures other than the linear open-ended figures (FIGS. 6A and 6C). As illustrated in FIGS. 7B and 7D, the points (contact points) where the free-form figure contact the sides of the circumscribed rectangle of the free-form figure are set as the representative points. Further, the intersection of two straight lines connecting the representative points, which are set on opposite sides of the circumscribed rectangle, are set as the reference point. If a plurality of contact points is on one side of a circumscribed rectangle, one of the representative points will be selected as the representative point based on a predetermined criterion.

For example, a representative point is set based on a predetermined criterion such as, "if an open end is included in the contact points, the contact point of that open end is given the priority, and if an open end is not included in the contact points, a contact point closest to the midpoint of the side including the contact points of the circumscribed rectangle is given the first priority". As a criterion used for setting a representative point for a free-form figure other than the linear open-ended figure, such as the free-form figures in FIGS. 7A and 7C, a criterion other than the above-described criterion can be used.

FIG. 8 is a table illustrating a method for setting a representative point according to the shape of the free-form figure which has been described above with respect to FIGS. 6A to 6D and 7A to 7D, and a correction method described in step S910 below.

Figure 9:
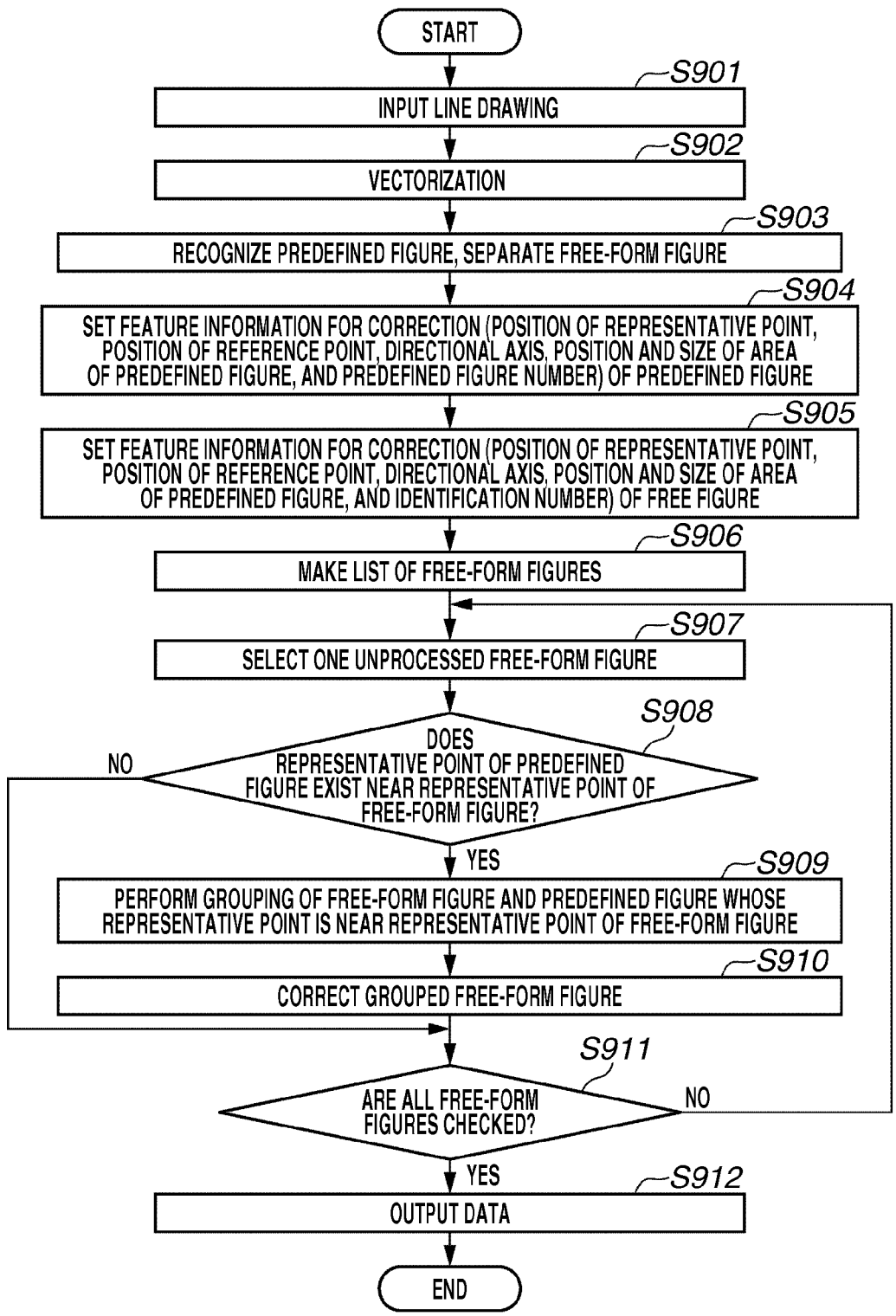
FIG. 9 is a flowchart illustrating processing of the figure processing apparatus according to the first exemplary embodiment.

Next, processing of the figure processing apparatus according to the first exemplary embodiment of the present invention will be described with reference to the flowchart in FIG. 9. In step S901, when a document image is input from the image scanner 111 or a camera, the figure processing apparatus stores the document image data in a work memory (a first memory area) of the RAM 40. Further, the line drawing region extraction unit 12 divides the document image data into regions corresponding to each attribute (e.g., by using the region segmentation method discussed in Japanese Patent Registration 4185858), extracts a line drawing region with the line drawing attribute out of the divided regions, and stores the extracted line drawing region in a second memory area of the RAM 40.

In step S902, the vectorization unit 2 performs vectorization of the image data included in the line drawing region extracted in step S901 by using a publicly known vectorization processing.

In step S903, the predefined figure identification unit 3 identifies a predefined figure included in the acquired vector data according to figure recognition. The predefined figure identification unit 3 recognizes the figure by comparing the feature quantity of the vector data with the feature data of a plurality of predefined figures. Further, the predefined figure/free-form figure separation unit 4 excludes data of the identified predefined figure from the vector data and separates the remaining data as a free-form figure. The predefined figure data and the free-form figure data which are separated in this manner are stored in a third memory area of the RAM 40.

In step S904, the correction feature information setting unit 5 sets feature information for correction, as described with reference to FIGS. 5D, 5E, 5F, 5J, 5K, and 5L, with respect to the predefined figure data recognized in step S903. As a result, various feature information for correction for each predefined figure is stored. The information includes a predefined figure number indicating a shape of the identified predefined figure, a position and size of the predefined figure region in the document (width and height of the region), a position of each representative point set for the predefined figure, a position of the reference point, and a direction of the directional axis. A unique predefined figure number is assigned in advance to each type (shape) of the registered predefined figure. The positions of the representative point and the reference point are the relative positions of the points when the upper left corner of the circumscribed rectangle of the identified predefined figure is set as the point of origin.

In step S905, the correction feature information setting unit 5 sets feature information for correction, as described with reference to FIGS. 6B, 6D, 7B, 7D, and 8, with respect to the free-form figure data acquired in step S903. As a result, various information of each free-form figure is stored. The information includes an identification number used for determining whether the free-form figure is a linear open-ended figure or a different type of free-form figure, a position and size of the free-form figure region in the document, a position of each representative point set for the free-form figure, a position of the reference point, and a direction of the directional axis.

The predefined figure data and the free-form figure data including the feature information for correction is stored in a fourth memory area of the RAM 40 in step S904 and step S905.

In step S906, the predefined figure/free-form figure grouping unit 6 draws up a list of data of the free-form figures whose feature information for correction has been set in step S905 and determines the number of the free-form figures and the position where the data is stored. State information regarding whether the processing in steps S908 to S910 described below has been executed or not is assigned to each listed piece of data of the free-form figures. All the state information of the free-form figures is initialized so that all the figures are in the unchecked state. Further, regarding each piece of data of the predefined figures, state information indicating whether the free-form figures are grouped with the predefined figure is assigned to such data. The grouping is performed in step S909 described below. Then, all the state information of the predefined figures is initialized so that all the figures are in an ungrouped state.

In step S907, based on the state information of the free-form figures listed in step S906, the predefined figure/free-form figure grouping unit 6 selects a free-form figure which has not undergone the processing of steps S908 to S910, and then the processing proceeds to step S908. Before the processing proceeds to step S908, the state information of the selected free-form figure is changed from "unchecked" to "checked".

In step S908, the predefined figure/free-form figure grouping unit 6 determines whether any representative point of a predefined figure exists within a range of a predetermined distance from each representative point of the free-form figure selected in step S907. If the determination is made only with respect to the representative points of the predefined figures whose state information is "ungrouped", the determination can be performed furthermore efficiently.

If a plurality of representative points of different predefined figures exists within a predetermined distance from one representative point of a free-form figure, then the predefined figure/free-form figure grouping unit 6 determines that the predefined figure including a representative point which is closest to the representative point of the free-form figure is the predefined figure to be grouped. Further, if a representative point of a predefined figure does not exist within a predetermined distance from one representative point of the free-form figure, then the predefined figure/free-form figure grouping unit 6 determines that a predefined figure to be grouped with the representative point of the free-form figure does not exist. In step S908, if a representative point of a predefined figure that can be grouped with the selected free-form figure exists (YES in step S908), the processing proceeds to step S909. If a representative point of a predefined figure that can be grouped with the selected free-form figure does not exist (NO in step S908), the processing proceeds to step S911.

In step S909, the predefined figure/free-form figure grouping unit 6 performs grouping of the representative point of the free-form figure which has been selected in step S907 and the representative point of the predefined figure which has been determined as the grouping target in step S908. To be more precise, the predefined figure/free-form figure grouping unit 6 generates information about a representative point of a predefined figure which can be grouped with a representative point of a free-form figure, and stores the information in a fifth memory area of the RAM 40. Further, state information of the predefined figure is changed to "grouped" which indicates that the predefined figure is grouped with a free-form figure.

In step S910, the grouped figure correction unit 7 performs correction processing of the free-form figure grouped in step S909. Details of the correction processing will be described below.

In step S911, the predefined figure/free-form figure grouping unit 6 determines whether state information of all the free-form figures in the list has been checked. If all the information has been checked (YES in step S911), the processing proceeds to step S912. If not (no in step S911), the processing returns to step S907, and the next free-form figure is selected.

In step S912, the output data generation unit 8 converts the data of the predefined figure and the free-form figure which have undergone the processing in steps S907 to S911 into data of a predetermined data format and outputs the data. For example, the output data generation unit 8 converts the data into vector data in the publicly known SVG (Scalable Vector Graphics) data format and outputs the data.

Next, the correction processing in step S910 in FIG. 9 will be described in detail with reference to the flowchart illustrated in FIG. 10. In step S200, the grouped figure correction unit 7 determines whether the number of the predefined figures grouped with the free-form figure in step S909 in FIG. 9 is one. If the number of the predefined figures is one (YES in step S200), the processing proceeds to step S210. If the number of the predefined figures is two or more (NO in step S200), the processing proceeds to step S220.

In step S220, the grouped figure correction unit 7 determines whether the number of the predefined figures grouped with the free-form figure is three or more. If the number of the grouped predefined figure is three or more (YES in step S220), the processing proceeds to step S230. If the number of the grouped predefined figure is not three or more (i.e., if the number of the grouped predefined figures is two) (NO in step S220), the processing proceeds to step S240.

If the selected free-form figure is a linear open-ended figure such as the one illustrated in FIGS. 6A and 6C, since the figure includes two representative points, the processing proceeds to step S210 or S240. Further, if the selected free-form figure is a figure other than the linear open-ended figure and is a figure such as the one illustrated in FIGS. 7A and 7C, since the figure includes four representative points, the processing proceeds to one of steps S210, S230, and S240. Thus, the correction method is changed according to the number of the predefined figures grouped with the selected free-form figure.

The processing in step S210 is executed by the grouped figure correction unit 7 when the number of the predefined figures grouped with the free-form figure is one. In step S210, the free-form figure is moved so that the position of the representative point of the grouped free-form figure and the position of the representative point of the grouped predefined figure overlap one another.

Details of the processing in step S210 will be described with reference to the example illustrated in FIG. 4. A line drawing in FIG. 4A including a free-form figure and a predefined figure is separated into the predefined FIG. 410 and the free-form figure 420 as illustrated in FIG. 4B. Further, the representative points as the feature information for correction are set to the positions indicated by the black circles as illustrated in FIG. 4C. Since a representative point of the predefined figure 411 is in the vicinity of the representative point of the free-form figure 421, the free-form figure 421 and the predefined FIG. 410 are considered as the figures to be grouped in step S909.

Thus, in step S210, the difference between the positions of the representative point of the free-form figure 421 and the corresponding representative point of the predefined figure 411 is added to the position of the free-form figure 421 so that the position of the representative point of the free-form figure 421 and the position of the representative point of the corresponding predefined figure 411 overlap one another. In other words, the position of the free-form figure 421 is moved by adding the difference between the positions of the representative points to the position of the figure region of the free-form figure 421. In this manner, the correction processing in step S210, which is the processing performed when the number of the predefined figures grouped with the selected free-form figure is one, is performed.

Next, processing in step S230 will be described in detail. If the number of the predefined figures grouped with the free-form figure is three or more, the grouped figure correction unit 7 executes the processing in step S230. According to this processing, the position of the grouped free-form figure is corrected so that the reference point of the grouped free-form figure and the center of gravity of a polygon formed by connecting each of the representative points of the predefined figures overlap one another.

Details of the processing in step S230 will be described with reference to FIGS. 12A to 12E and 13A to 13E. According to the present embodiment, since the number of the representative points of the free-form figure is four at the maximum, the number of the predefined figures that can be grouped with one free-form figure is four at the maximum. FIGS. 12A to 12E illustrate an example of a line drawing including one free-form figure and three predefined figures. FIGS. 13A to 13E illustrate an example of a line drawing including one free-form figure and four predefined figures. The black circles and the white circles in FIGS. 12A to 12E and 13A to 13E are feature information for correction set in steps S904 and S905 in FIG. 9. The black circle represents the representative point. The white circle represents the reference point.

Figure 12A:
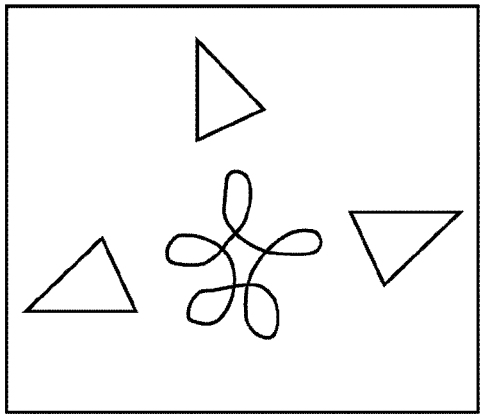
FIGS. 12A to 12E are correction examples of a case where three predefined figures are grouped with a free-form figure.
Figure 12B:
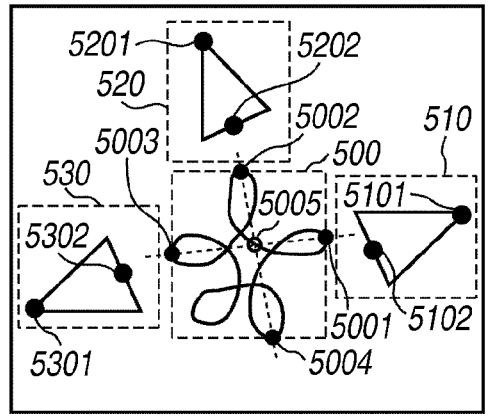
Figure 12C:
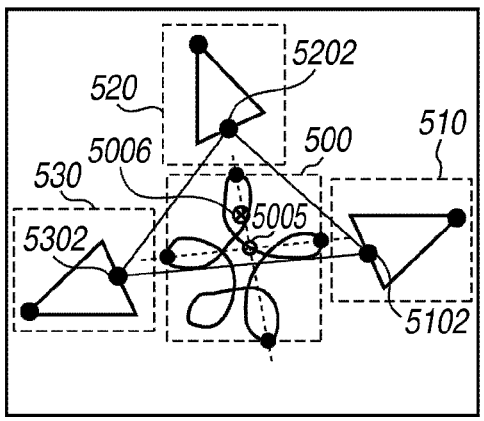
Figure 12D:
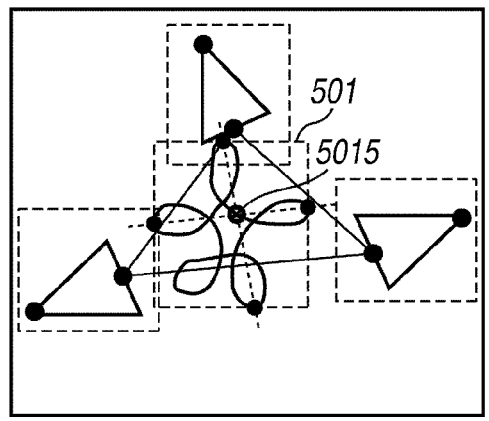
Figure 12E:
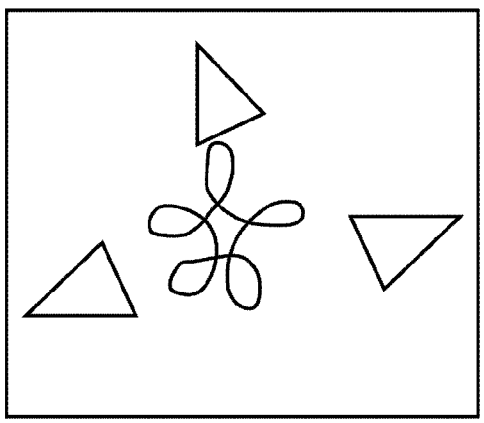

Regarding the input image in FIG. 12A, a free-form figure 500 and three predefined figures 510, 520, and 530 are included as illustrated in FIG. 12B and feature information for correction is set for these figures. Each of the predefined figures includes two representative points. In other words, representative points 5101 and 5102, 5201 and 5202, and 5301 and 5302 are set for the predefined figures 510, 520, and 530, respectively. Further, since the free-form figure 500 is a closed figure, four representative points 5001, 5002, 5003, and 5004 and a reference point 5005 are set. The representative points 5102, 5202, and 5302 of the predefined figures are in the vicinity of the representative points 5001, 5002, and 5003 of the free-form figure 500. Thus, in step S909 in FIG. 9, the predefined figures are grouped with the free-form figure.

When the predefined figures are grouped with the free-form figure, information that the corresponding representative points of the free-form figure 500 and each of the predefined figures 510, 520, and 530 are the representative points 5001 and 5102, 5002 and 5202, and 5003 and 5302 is generated. Thus, in step S230 in FIG. 10, the position of the free-form figure 500 is moved so that the reference point 5005 of the free-form figure 500 and a reference position of a triangle formed by the representative points 5102, 5202, and 5302 of the three predefined figures that are grouped overlap one another. According to the present embodiment, the reference point of such a triangle is the barycentric position of the triangle (point 5006) in FIG. 12C. Accordingly, the free-form figure 500 is moved to a position 501 in FIG. 12D. In other words, the difference between the position of the reference point of the free-form figure 500 and the reference position of the triangle formed by the three representative points is added to the position information of the free-form figure 500. The position information of the free-form figure 500 is the position of the upper left corner of the circumscribed rectangle of the free-form figure when the upper left corner of the whole image is set as the point of origin.

In this manner, in step S230, the correction processing of the grouped figures when three predefined figures are grouped with a free-form figure is performed. The reference position (barycentric position) of a triangle can be obtained by calculating a mean value of the coordinate values of each of the vertices of the triangle. Thus where $(x_1, y_1)$, $(x_2, y_2)$, and $(x_3, y_3)$ are the coordinates of each of the vertices $P_1$, $P_2$, and $P_3$ of the triangle, coordinates $(x_G, y_G)$ of the barycentric position $P_G$ of the triangle is given by:

$$x_G=(x_1+x_2+x_3)/3$$

$$y_G=(y_1+y_2+y_3)/3.$$

Figure 13A:
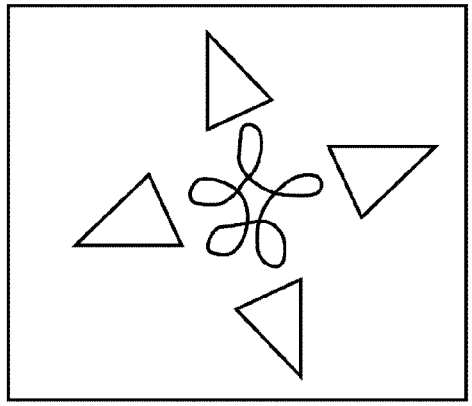
FIGS. 13A to 13E are correction examples of a case where four predefined figures are grouped with a free-form figure.
Figure 13B:
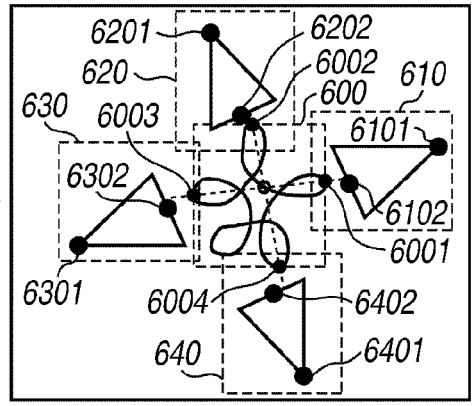
Figure 13C:
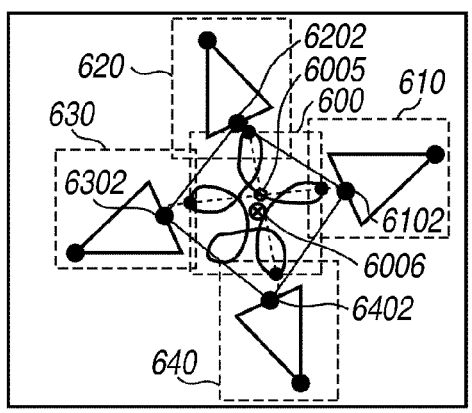
Figure 13D:
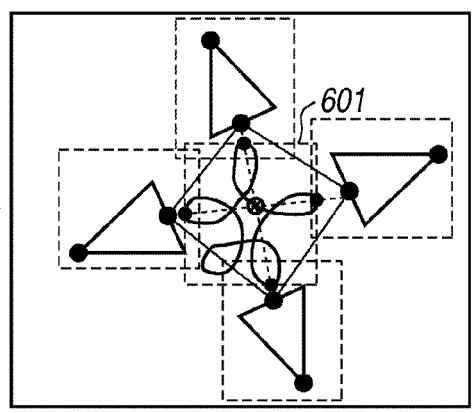
Figure 13E:
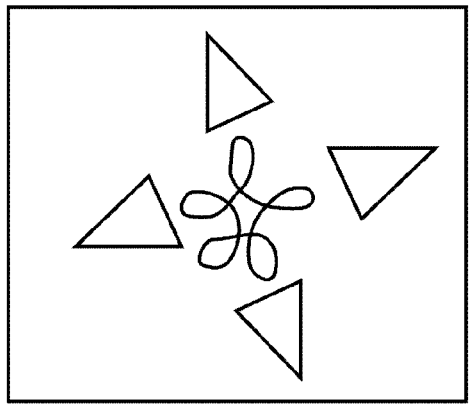

Regarding the input image in FIG. 13A, a free-form figure 600 and four predefined figures 610, 620, 630, and 640 are included as illustrated in FIG. 13B and feature information for correction is set for these figures. Each of the predefined figures includes two representative points. In other words, representative points 6101 and 6102, 6201 and 6202, 6301 and 6302, and 6401 and 6402 are set for the predefined figures 610, 620, 630, and 640, respectively. Further, four representative points 6001, 6002, 6003, and 6004 and a reference point 6005 are set for the free-form figure 600.

The representative points 6102, 6202, 6302, and 6402 of the predefined figures are in the vicinity of the representative points 6001, 6002, 6003, and 6004 of the free-form figure 500. Thus, the predefined figures are grouped with the free-form figure. When the predefined figures are grouped with the free-form figure, information that the corresponding representative points of the free-form figure 600 and each of the predefined figures 610, 620, 630, and 640 are the representative points 6001 and 6102, 6002 and 6202, 6003 and 6302, and 6004 and 6402 is generated.

Figure 10:
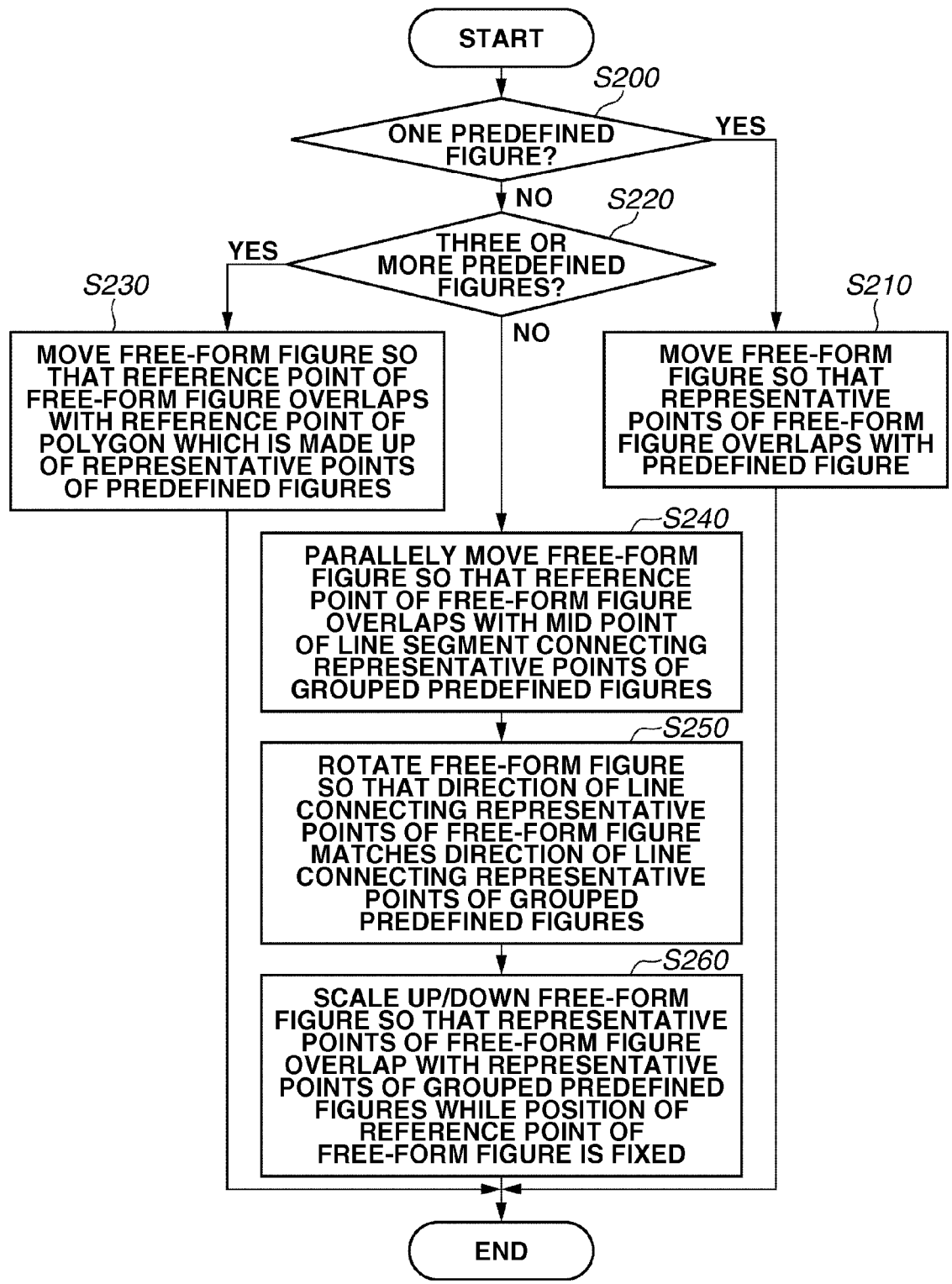
FIG. 10 is a flowchart illustrating details of correction processing of grouped figures according to the first exemplary embodiment.

Thus, in step S230 in FIG. 10, the position of the free-form figure 600 is moved so that the reference point 6005 of the free-form figure 600 and a reference position of a quadrangle formed by the representative points 6102, 6202, 6302, and 6402 of the four predefined FIGS. 610, 620, 630, and 640 that are grouped, overlap one another. The reference position of the quadrangle is point 6006 in FIG. 13C. Thus, the free-form figure 600 is moved to a position 601 in FIG. 13D. In other words, the difference between the position of the reference point of the free-form figure 600 and the reference position of the quadrangle formed by the four representative points is added to the position information of the free-form figure 600. The position information of the free-form figure 600 is the position of the upper left corner of the circumscribed rectangle of the free-form figure when the upper left corner of the whole image is set as the point of origin.

In this manner, in step S230, the correction processing of the grouped figures when four predefined figures are grouped with a free-form figure is performed. According to the present embodiment, the reference position of the quadrangle is a mean value of the coordinates of each vertex of the quadrangle.

Next, details of the processing in steps S240 to S260 will be described. The processing in steps S240 to S260 is executed by the grouped figure correction unit 7 when the number of the predefined figures grouped with the free-form figure is two. In steps S240 to S260, the free-form figure is corrected so that the positions of the two representative points of the grouped free-form figure and the positions of the two representative points of the grouped predefined figures overlap one another. According to the present exemplary embodiment, after moving the position of the free-form figure, the free-form figure is rotated so that the direction of the line that connects the two representative points of the free-form figure matches with the direction of the line that connects the representative points of the predefined figure. Further, after the rotation of the free-form figure, the scaling of the free-form figure is performed. In this manner, the free-form figure is corrected.

Details of the processing in steps S240 to S260 will be described with reference to FIGS. 14A to 14F. According to processing in steps S901 to S903 in FIG. 9, a line drawing including a free-form figure and two predefined figures as illustrated in FIG. 14A is separated into a free-form figure 800 and predefined figures 810 and 820 as illustrated in FIG. 14B. According to the processing in step S904, two representative points are set for each of the predefined figures 810 and 820 as feature information for correction. These points are representative points 8101 and 8102, and 8201 and 8202. Further, since the free-form figure 800 is determined as a linear open-ended figure, two representative points 8001 and 8002 are set and a midpoint of the points is set as a reference point 8003 in step S905.

Further, since the representative point 8102 of the predefined figure 810 and the representative point 8202 of the predefined figure 820 are in the vicinity of the representative points 8001 and 8002 of the free-form figure 800, they are determined as the figures to be grouped in step S909. When the predefined figures are grouped with the free-form figure, information that the corresponding representative points of the free-form figure 800 and each of the predefined figure 810 and 820 are the representative points 8001 and 8102, and 8002 and 8202 is generated.

In step S240 in FIG. 10, first, as illustrated in FIG. 14C, the grouped figure correction unit 7 sets a midpoint 8004 of a line connecting the representative points 8102 and 8202 of the grouped predefined figures as the reference position of the predefined figures. Then, the grouped figure correction unit 7 performs parallel displacement of the free-form figure 800 so that the position of the reference point 8003 of the free-form figure 800 and the midpoint 8004, which is the reference point of the grouped predefined figures, overlap one another.

In other words, the difference between the position of the reference point 8003 of the free-form figure 800 and the midpoint 8004 of the two representative positions is added to the position information of the free-form figure 800. The position information of the free-form figure is the position of the upper left corner of the circumscribed rectangle of the free-form figure when the upper left corner of the whole image is set as the point of origin. As a result, since the free-form figure is moved to a position 801 as illustrated in FIG. 14D, the reference point of the free-form figure is moved to a position indicated by a point 8013 (hereinafter the reference point 8013), and the positions of the representative points are also moved to points 8011 and 8012 (hereinafter the representative points 8011 and 8012).

In step S250, the grouped figure correction unit 7 rotates the free-form figure 801 about the reference point 8013 so that the direction of a straight line that connects the representative points 8011 and 8012 of the free-form figure 801 matches with the direction of the straight line that connects the representative points 8102 and 8202 of the two predefined figures. Thus, where $(x_c, y_c)$ are the coordinates of the reference point 8013 (the center of rotation), $(x_1, y_1)$ are the coordinates of the representative point 8012, and $(x_2, y_2)$ are the coordinates of the representative point 8012, the rotation angle is denoted by θ, and where
$x_1'=x_1-x_c$; $y_1'=y_1-y_c$; $x_2'=x_2-x_c$; $y_2'=y_2-y_c$, sin θ and cos θ are given by:

$$\sin θ=(x_1'y_2'-x_2'y_1')/(\sqrt{x_1'^2+y_1'^2}+\sqrt{x_2'^2+y_2'^2})$$

$$\cos θ=(x_1'x_2'+y_1'y_2')/(\sqrt{x_1'^2+y_1'^2}+\sqrt{x_2'^2+y_2'^2})).$$

Thus, by converting the coordinates $(x_i, y_i)$, which are coordinates of an arbitrary point that constitutes the free-form figure 801, into $(x_i', y_i')$, the above-described rotation is realized where $$x_i'=x_c+(x_i-x_c)\cdot\cos θ-(y_i-y_c)\cdot\sin θ \quad y_i'=y_c+(x_i-x_c)\cdot\sin θ+(y_i-y_c)\cdot\cos θ.$$

The result of the rotation processing is illustrated in FIG. 14E. In FIG. 14E, a free-form figure 802 is the free-form figure after the rotation. Further, representative points 8021 and 8022 are the representative points after the rotation of the free-form figure, and a reference point 8023 is the reference point of the free-form figure.

In step S260, the grouped figure correction unit 7 performs scaling of the free-form figure 802. When the scaling is performed, the reference point is fixed to the position of the reference point 8023 of the free-form figure 802 (the free-form figure after the rotation). The free-form figure 802 is scaled according to the magnification which is a value that realizes overlapping of the positions of the representative points 8021 and 8022 of the free-form figure 802 with the representative points of the corresponding predefined figures. In other words, the scaling is performed so that the representative points 8021 and 8022 overlap with the representative point 8102 of the predefined figure 810 and the representative point 8202 of the predefined figure 820.

A ratio (α) of the distance between the representative points 8102 and 8202 to the distance between the representative points 8021 and 8022 can be used as the magnification. Where α is the magnification (the above-described ratio) and where $(x_c, y_c)$ are the coordinates of the reference point 8023 of the free-form figure 802, the coordinates $(x_i, y_i)$ of an arbitrary point that constitutes the free-form figure 802 are changed to $(x_i', y_i')$ by the coordinates determined by:

$$x_i'=x_c+(x_i-x_c)\cdot α$$

$$y_i'=y_c+(y_i-y_c)\cdot α$$

The result of the state obtained from the scaling is illustrated in FIG. 14F. The free-form figure is scaled and a figure 803 is obtained. Positions of representative points 8031 and 8032 of the free-form figure overlap with the positions of the representative points of the predefined figure 810 and 820. In this manner, in steps S240 to S260, the correction processing of the grouped figures when the number of the predefined figures grouped with a free-form figure is two is performed.

Details of the correction processing of the figures executed in step S910 in FIG. 9 have been described with reference to the flowchart in FIG. 10.

Correction processing of the grouped figures executed in step S910 in FIG. 9 according to a second exemplary embodiment will be described in detail with reference to the flowcharts in FIG. 11 and FIG. 15.

Figure 11:
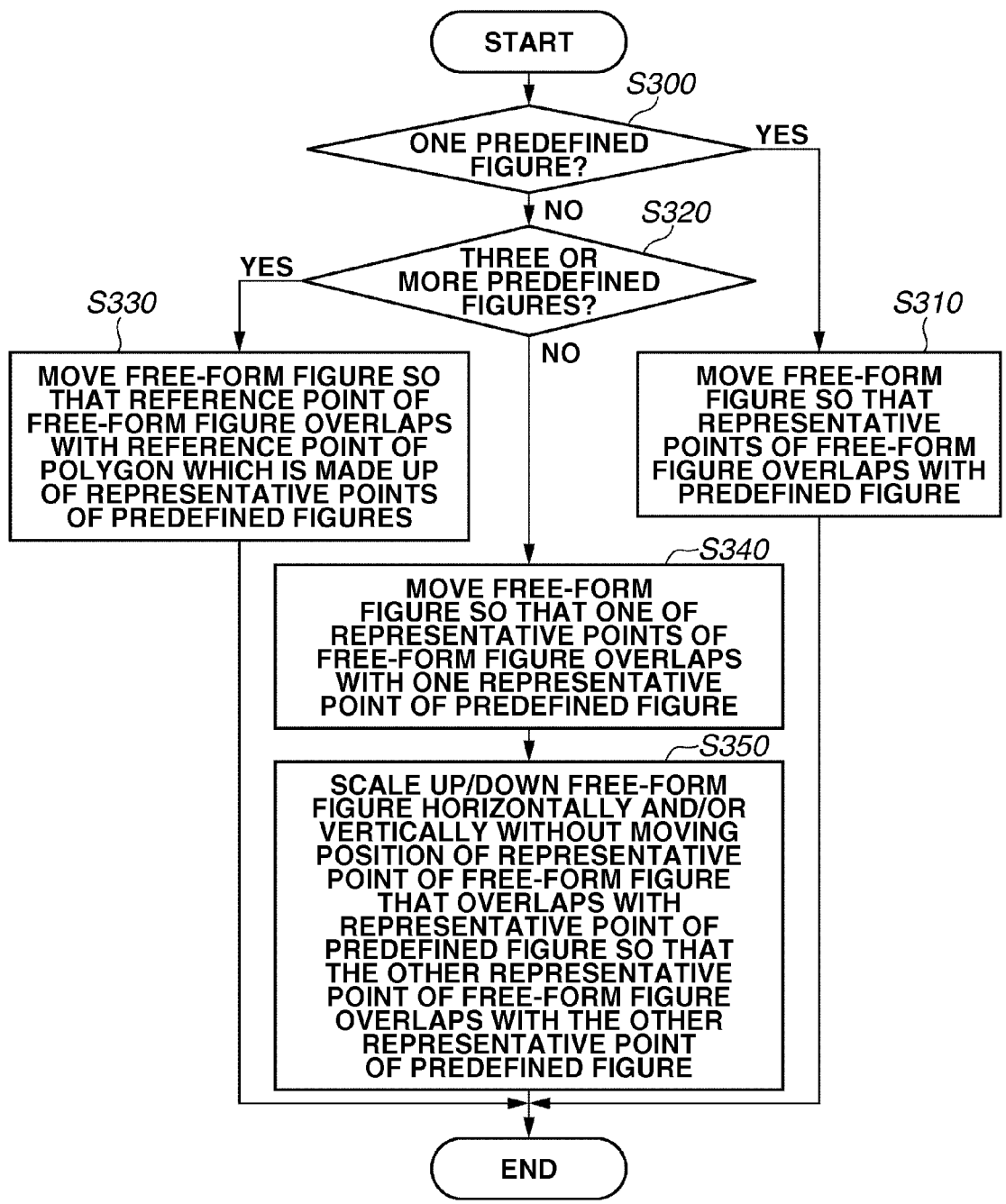
FIG. 11 is a flowchart illustrating details of correction processing of grouped figures according to a second exemplary embodiment of the present invention.

Since the processing in steps S300 to S330 in the flowchart in FIG. 11 is exactly the same as the processing in steps S200 to S230 in the flowchart in FIG. 10, the description is not repeated. Processing in steps S340 and S350, which is different from the processing in the first exemplary embodiment, will be described. In other words, processing which is performed when the number of the predefined figures grouped with the free-form figure is two will be described. According to the present exemplary embodiment, after moving the position of one of the representative points of a free-form figure so that it overlaps the position of a representative point of a corresponding predefined figure, the free-form figure is scaled independently in length and width so that the position of the other representative point of the free-form figure overlaps with the position of the corresponding representative point of the other predefined figure.

Figure 15A:
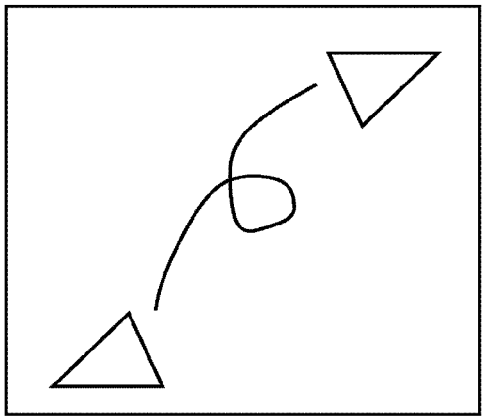
FIGS. 15A to 15E are correction examples of a case where two predefined figures are grouped with a free-form figure according to the second exemplary embodiment.
Figure 15B:
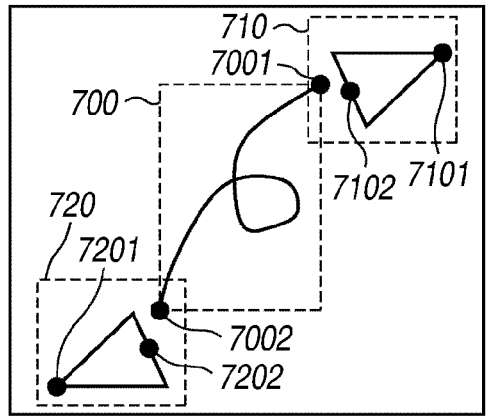

Details of the processing in steps S300 to S330 will be described with reference to the example illustrated in FIGS. 15A to 15E. According to processing in steps S901 to S903 in FIG. 9, a line drawing including a free-form figure and two predefined figures as illustrated in FIG. 15A is separated into a free-form figure 700 and predefined figures 710 and 720 as illustrated in FIG. 15B. According to the processing in step S904, two representative points are set for each of the predefined figures 710 and 720 as feature information for correction. These points are representative points 7101 and 7102, and 7201 and 7202. Further, since the free-form figure 700 is determined as a linear open-ended figure, two representative points 7001 and 7002 are set in step S905.

Further, since the representative point 7102 of the predefined figure 710 and the representative point 7202 of the predefined figure 720 are in the vicinity of the representative points 7001 and 7002 of the free-form figure 700, they are determined as the figures to be grouped in step S909. When the predefined figures are grouped with the free-form figure, information that the corresponding representative points of the free-form figure 700 and each of the predefined figures 710 and 720 are the representative points 7001 and 7102, and 7002 and 7202 is generated.

Figure 15C:
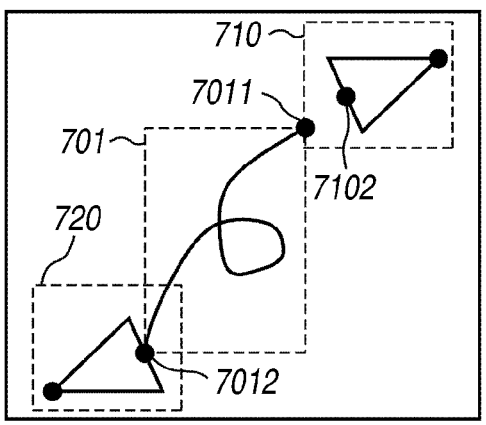

In step S340 in FIG. 11, the grouped figure correction unit 7 performs parallel displacement of the position of the free-form figure 700 so that the free-form figure is moved to a position 701 in FIG. 15C and the representative point 7002 of the free-form figure 700 overlaps with the corresponding representative point 7202 of the predefined figure 720. In other words, the difference between the positions of the representative point 7002 of the free-form figure 700 and the corresponding representative point 7202 of the predefined figure 720 is added to the position information of the free-form figure 700. The position information of the free-form figure 700 is the position of the upper left corner of the circumscribed rectangle of the free-form figure when the upper left corner of the whole image is set as the point of origin. As a result, as illustrated in FIG. 15C, the positions of the representative points of the free-form figure 701 after the movement are changed to the positions 7011 and 7012.

In step S350, the grouped figure correction unit 7 performs scaling of the free-form figure 701 so that the position of the representative point 7011 of the free-form figure and the position of the representative point 7102 of the corresponding predefined figure overlap one another while the other end of the free-form figure is fixed to the position 7012 determined in step S340. Different scaling ratio is used in the horizontal and the vertical directions. At this time, the scaling factor of the free-form figure is magnification (β) of a component in the horizontal direction between the representative points 7102 and 7012 with respect to a component in the horizontal direction between the representative points 7011 and 7012. The component in the horizontal direction is an absolute value of the difference between the coordinate values in the x direction. Similarly, based on the coordinates of each representative point, the magnification (y) in the vertical direction is also obtained.

Where the magnification component in the horizontal direction is β and the component in the vertical direction is γ, and the coordinates of the reference point 7012 when the free-form figure 701 is magnified are coordinates $(x_2, y_2)$, the coordinates of an arbitrary point $(x_i, y_i)$ that constitutes the free-form figure 701 can be changed to $(x_i', y_i')$ by:

$$x_i' = x_2 + (x_i - x_2) \cdot \beta$$

$$y_i' = y_2 + (y_i - y_2) \cdot \gamma$$

Figure 15D:
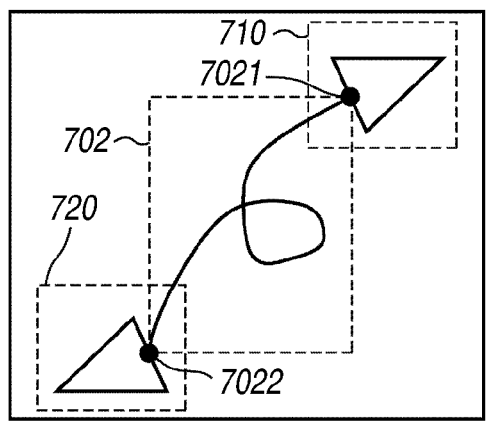
Figure 15E:
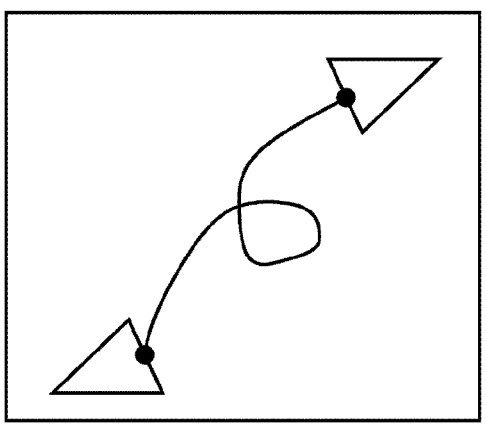

The result of the state obtained from the scaling is illustrated in FIG. 15D. The free-form figure is scaled independently in length and width and a figure 702 is obtained. Positions of representative points 7021 and 7022 of the free-form figure overlap with the positions of the representative points of the predefined figures 710 and 720. In this manner, in steps S340 and S350, the correction processing of the grouped figures when the number of the predefined figures grouped with a free-form figure is two is performed. Although the free-form figure is distorted as the scaling of the free-form figure is generally different in the vertical and the horizontal directions according to the second exemplary embodiment, the amount of calculation is small. Accordingly, high speed processing can be achieved compared to the first exemplary embodiment where the processing in steps S240 to S260 is performed.

According to the first and the second exemplary embodiments, if a plurality of representative points of a predefined figure exists in the vicinity of each of the representative points of a free-form figure, a representative point of the predefined figure which is closest to the representative point of the free-form figure is selected and the representative points are grouped. The selection method of the present invention is not limited to such a method. For example, if an angle of a directional axis of each of the plurality of the predefined figures is obtained, a representative point of a predefined figure whose angle of the directional axis is closest to the angle of the straight line connecting the representative points of the free-form figure can be selected as the representative point to be grouped.

Now, a fourth exemplary embodiment will be described. According to the above-described embodiments, a representative point of a predefined figure in the vicinity of each representative point of a free-form figure is grouped. However, the present invention is not limited to such an example and representative points of other free-form figures can be grouped. In other words, if state information indicating whether a free-form figure is grouped with a different free-form figure is assigned, in steps S908 to S909, in addition to the representative point of a predefined figure in the vicinity of each representative point of the free-form figure, grouping of a representative point with a different free-form figure is also permitted.

In this case, each piece of data of the free-form figure grouped with the different free-form figure is assigned state information that indicates the data has been checked and is data of a grouped figure. Further, in step S200 or S220 in FIG. 10 and in step S300 or S310 in FIG. 11, the figures whose number is checked will be both the predefined figures and the free-form figures that are grouped with the free-form figure.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-246429 filed Nov. 2, 2010, which is hereby incorporated by reference herein in its entirety.

What is claimed is:

1. An apparatus comprising:
   a separation unit configured to separate a figure included in an input image into a predefined figure of a predetermined shape and a free-form figure;
   a first setting unit configured to set a first representative point at a predetermined position according to a type of the predefined figure with respect to the separated predefined figure;
   a second setting unit configured to set a second representative point according to a criterion based on a type of the free-form figure with respect to the separated free-form figure;
   a grouping unit configured to, if the first representative point is in a vicinity of the second representative point, group the second representative point and the first representative point; and
   a figure correction unit configured to correct the free-form figure based on a position of the grouped second representative point and a position of the grouped first representative point.

2. The apparatus according to claim 1, wherein the figure correction unit changes a correction method according to a number of the predefined figures grouped with the free-form figure.

3. The apparatus according to claim 2, wherein if the number is one, the figure correction unit performs the correction by executing parallel displacement of the free-form figure so that a position of the grouped second representative point and a position of the grouped first representative point overlap.

4. The apparatus according to claim 2, wherein if the number is three or more, the figure correction unit performs the correction by executing parallel displacement of the free-form figure so that a position of the second reference point and a reference position of a polygon formed by the representative points of the grouped predefined figures overlap.

5. The apparatus according to claim 2, wherein if the number is two, the figure correction unit performs the correction by executing moving processing, rotation processing, and magnification processing with respect to the grouped free-form figure so that positions of two grouped second representative points and positions of two grouped first representative points overlap.

6. The apparatus according to claim 2, wherein if the number is two, the figure correction unit performs the correction by executing moving processing, and magnification processing independently performed in length and width directions with respect to the grouped free-form figure so that positions of two grouped second representative points and positions of two grouped first representative points overlap.

7. The apparatus according to claim 1, wherein if the free-form figure includes two open ends and if the two open ends are on a circumscribed rectangle of the free-form figure, the second setting unit sets the two open ends as second representative points of the free-form figure.

8. The apparatus according to claim 7, wherein if the free-form figure includes two open ends and if the two open ends are not on a circumscribed rectangle of the free-form figure, the second setting unit sets the second representative point of the free-form figure on each contact point of each side of the circumscribed rectangle of the free-form figure.

9. A method executed by a computer, the method comprising:
separating a figure included in an input image into a predefined figure of a predetermined shape and a free-form figure;
setting a first representative point at a predetermined position according to a type of the predefined figure with respect to the separated predefined figure;
setting a second representative point according to a criterion based on a type of the free-form figure with respect to the separated free-form figure;
grouping the second representative point and the first representative point if the first representative point is in the vicinity of the second representative point; and
correcting the free-form figure based on a position of the grouped second representative point and a position of the grouped first representative point.

10. The method according to claim 9, wherein if the free-form figure includes two open ends and if the two open ends are on a circumscribed rectangle of the free-form figure according to the second setting, the two open ends are set as the second representative points.

11. The method according to claim 10, wherein if the free-form figure includes two open ends and if the two open ends are not on a circumscribed rectangle of the free-form figure according to the second setting, the second representative point is set on each contact point of each side of the circumscribed rectangle of the free-form figure.

12. A non-transitory computer-readable storage medium storing a computer program causing a computer to execute processing comprising:
separating a figure included in an input image into a predefined figure of a predetermined shape and a free-form figure;
setting a first representative point at a predetermined position according to a type of the predefined figure with respect to the separated predefined figure;
setting a second representative point according to a criterion based on a type of the free-form figure with respect to the separated free-form figure;
grouping the second representative point and the first representative point if the first representative point is in the vicinity of the second representative point; and
correcting the free-form figure based on a position of the grouped second representative point and a position of the grouped first representative point.

13. The storage medium according to claim 12, wherein a correction method is changed according to a number of the predefined figures grouped with the free-form figure.

14. The storage medium according to claim 13, wherein if the number is one, the correction is performed by executing parallel displacement of the free-form figure so that a position of the grouped second representative point and a position of the grouped first representative point overlap.

15. The storage medium according to claim 13, wherein if the number is three or more, the correction is performed by executing parallel displacement of the free-form figure so that a position of the set second reference point and a reference position of a polygon formed by the grouped first representative points overlap.

16. The storage medium according to claim 13, wherein if the number is two, the correction is performed by executing moving processing, rotation processing, and magnification processing with respect to the grouped free-form figure so that positions of two grouped second representative points and positions of two grouped first representative points overlap.

17. The storage medium according to claim 13, wherein if the number is two, the correction is performed by executing moving processing, and magnification processing independently performed in length and width directions with respect to the grouped free-form figure so that positions of two grouped second representative points and positions of two grouped first representative points overlap.

18. The storage medium according to claim 12, wherein if the free-form figure includes two open ends and if the two open ends are on a circumscribed rectangle of the free-form figure according to the second setting, the two open ends are set as the second representative points.

19. The storage medium according to claim 18, wherein if the free-form figure includes two open ends and if the two open ends are not on a circumscribed rectangle of the free-form figure according to the second setting, the second representative point is set on each contact point of each side of the circumscribed rectangle of the free-form figure.

* * * * *